No. 879,963. PATENTED FEB. 25, 1908.
L. HIRT.
FILTER.
APPLICATION FILED MAY 15, 1907.
2 SHEETS—SHEET 1.
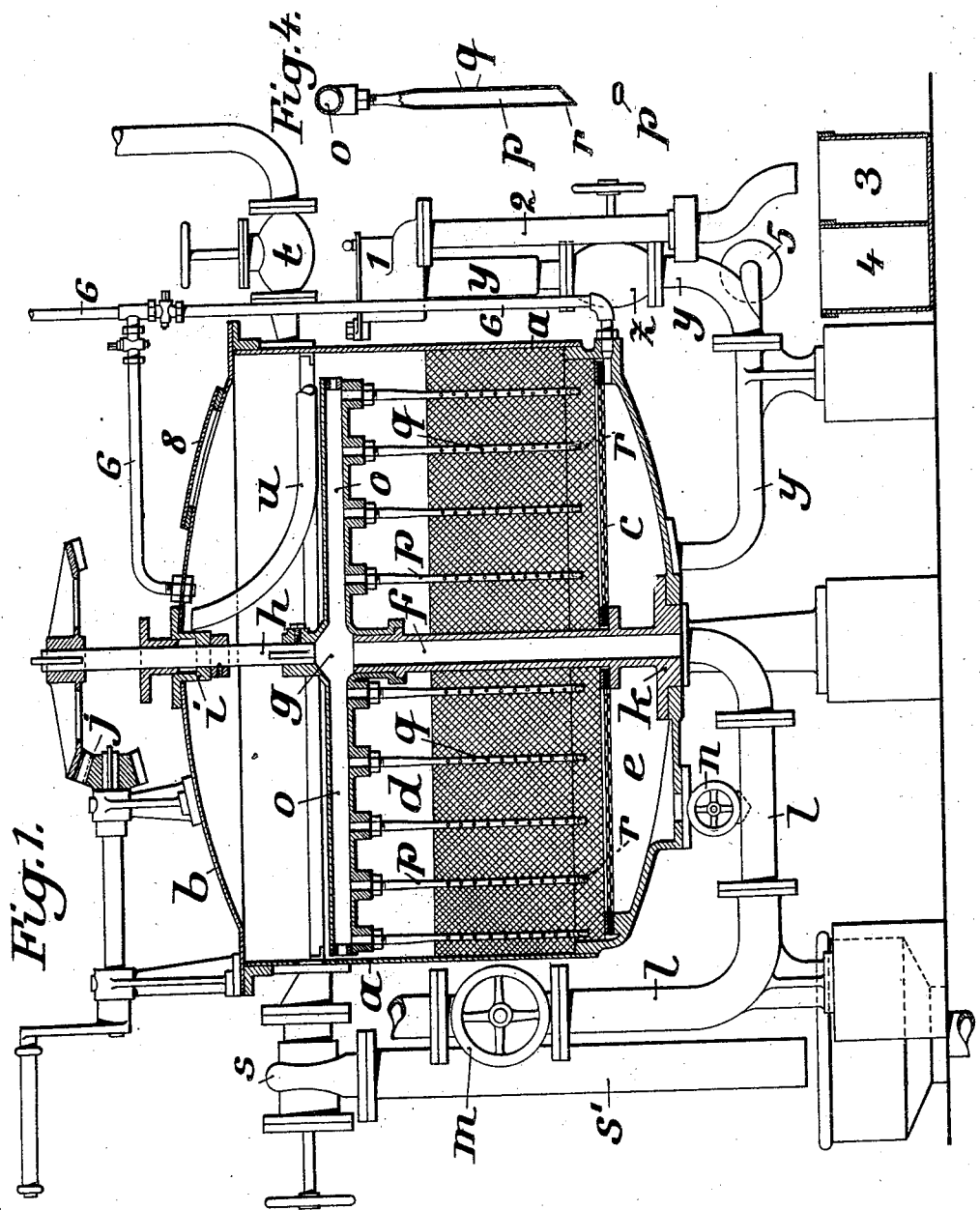
WITNESSES
Paul Moscow
Paul Galda
INVENTOR
Ludwig Hirt
ATTORNEY No. 879,963. PATENTED FEB. 25, 1908.
L. HIRT.
FILTER.
APPLICATION FILED MAY 15, 1907.

2 SHEETS—SHEET 2.

WITNESSES
Paul Moscow
Paul Galda.

INVENTOR
Ludwig Hirt
ATTORNEY

UNITED STATES PATENT OFFICE.

LUDWIG HIRT, OF GREVENBROICH, GERMANY, ASSIGNOR TO MASCHINENFABRIK GREVENBROICH, OF GREVENBROICH, GERMANY.

FILTER.

No. 879,963.  Specification of Letters Patent.  Patented Feb. 25, 1908.

Application filed May 15, 1907. Serial No. 373,751.

*To all whom it may concern:*

Be it known that I, LUDWIG HIRT, engineer, a subject of the German Emperor, residing at Grevenbroich, 80 Neuenhausenerstrasse, Germany, have invented certain new and useful Improvements in Filters; and I do hereby declare the following to be a full, clear, and exact description of the invention, such as will enable others skilled in the art to which it appertains to make and use the same.

This invention relates to filtering apparatus provided with means both for lixiviating or purifying the separated substances and for bringing about a thorough rinsing and cleansing of the filtering material freeing it from impurities quickly and with but small consumption of water.

Figure 3:
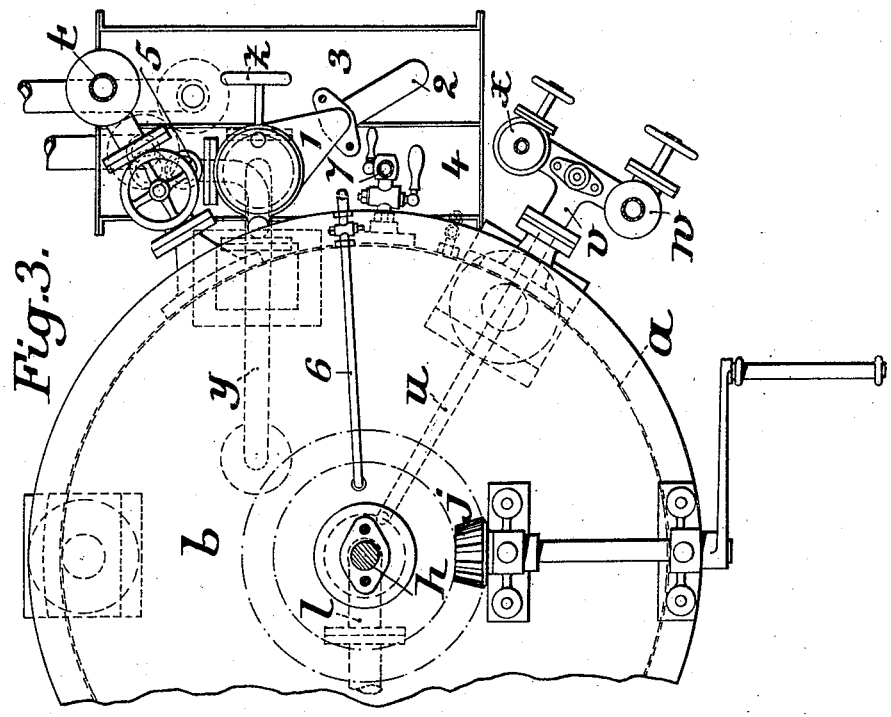
Figure 2:
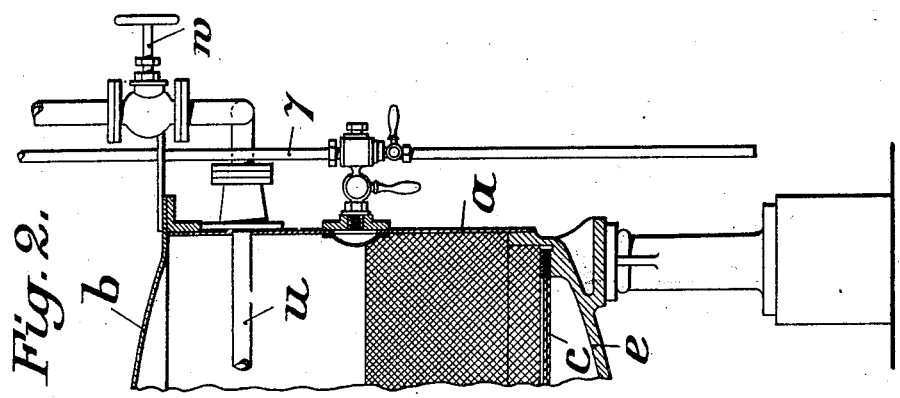

A filtering apparatus constructed according to this invention is shown in the accompanying drawings, Figures 1 and 2 being longitudinal sections and Fig. 3 a plan while Fig. 4 shows an injector pipe in longitudinal cross-section.

The filtering apparatus comprises a cylindrical tank $a$ which, if desired, can be closed by a cover $b$. The tank is divided by means of a perforated bottom $c$ into a large upper chamber $d$ and a small bottom chamber $e$. The chamber $d$ on the perforated bottom $c$ of which the filtering material is situated is provided with a stirring and rinsing device. This device comprises a central vertical pipe $f$ closed at the top or provided with a hollow head $g$ which is extended to form a spindle $h$. The upper end of the spindle $h$ or in some cases of the pipe $f$ itself, is led through a stuffing box $i$ in the cover, the part of the spindle or pipe which extends outside the cover being provided with a driving gear $j$. The bottom of the pipe $f$ is mounted in a bearing $k$. The rinsing water supply pipe $l$ is provided with a valve $m$, has one branch connected to the bottom of the pipe $f$, its other branch being connected to the chamber $e$ by means of the valve $n$. The pipe $f$ or the pipe head $g$ is formed integral with one or more horizontal pipes $o$; and from the pipe $o$ pipes $p$ branch off the lower ends of which are closed. Perforations $q$ are formed on these portions of the pipes $p$ which are immersed in the filtering material. These pipes are preferably cut off at an angle at the bottom and at the lowest point, on the side opposite the perforations $q$ are provided with large openings $r$ (Fig. 4) the object of which is to enable any filtering material that may get into the pipe $p$ to be easily removed by rinsing. The pipes $p$ are preferably of oval cross section as shown in the drawing so as to offer the smallest possible resistance to the filtering material during the movement of the stirring device.

To the upper part of the chamber $d$ is connected a pipe $s'$ provided with a valve $s$ for discharging dirty water, and a pipe controlled by a valve $t$ is connected to the upper part of the chamber $d$ for admitting the syrup to be filtered. The purifying device is also mounted at the top of the chamber $d$. In the interior of the vessel is arranged an upwardly deflected pipe $u$ which is connected outside to a T-shaped pipe $v$ to which are connected valves $w$ and $x$ for the admission of the purifying water and steam.

From the chamber $e$ a discharge pipe $y$ provided with a valve $z$, leads to the syrup overflow tank 1 which must be arranged at least at the same level as that of the filtering layer in the chamber $d$, to prevent the filter from becoming emptied during continuous filtering. A pipe 2 connected to the box 1 and provided with a swivel pipe goes to the conduits for the filtered syrup or to the purifying water conduit 4. A cock 5 on the discharge conduit $y$ serves for completely emptying the filter of liquid and the pipe 6 connected to the chambers $d$ and $e$ permits the air to be discharged. For observing the level of the syrup there is provided on the vessel $a$ a gage glass 7 provided with valves (Fig. 2).

If the filter is closed by a cover, then the latter is also provided with a flap door 8.

During filtration the valves $s\ m\ n\ x\ w$ and 5 are closed and the valves $t$ and $z$ open. The juice entering through the valve $t$ into the chamber $d$ penetrates through the filtering layer, passes through the perforated bottom $c$, filters through into the chamber $e$ and is thence conveyed by the pipe $y$ to the syrup overflow box 1, whence it escapes through the conduit 3.

When the filter no longer supplies a sufficient quantity of clear filtered syrup then the residue and the filtering medium have to be purified and the supply of syrup is stopped by closing the valve $t$. Then after the partial discharge of the syrup up to the filtering layer if necessary the valves $x$ and $w$ are opened, permitting the purifying water and steam to pass through the pipe $u$ into the chamber $d$. The hot water passes through the layer of residue and the filtering material whereby the syrup contained therein is lixiviated. The purifying water which contains a large proportion of sugar is discharged into the conduit 3, while the weaker solution is discharged into the conduit 4. After the purification has been completed, the valves $x$ and $w$ are closed, the water contained in the chamber $e$ is discharged through the cock 5 and if desired the layer of residue on the filtering material removed. Filtration can then be continued until the filter has to be cleaned a second time. For this second cleaning the valves $t$ $x$ $w$ and $z$ are again closed and the valves $m$ $n$ $s$ opened. The rinsing water passes then through the pipe $l$ into the pipe $f$ where it rises and flows to the pipe $o$ and the pipes $p$ through the openings $q$ of which it is projected and agitates the filtering medium at the same time rinsing it away from the pipes, whereby the stirring device can be easily rotated by means of the driving gear. The filtering medium is then thoroughly mixed by means of the said stirring device, while at the same time the injected water stirs it up, so that the impurities which it has collected are quickly and thoroughly separated from it. At the same time, water passes through the valve $n$ into the chamber $e$ and thence through the perforated bottom, in the direction opposite to that of the filtering through the filtering layer. Owing to this rising current of water the filtering medium is freed from the residue of the syrup which is rinsed away and drawn off through the valves $s$ and $s'$. After the filtering material has been cleaned, the cocks $m$ $n$ $s$ are closed, the valves $t$ and $z$ opened and the filtering again proceeded with. The rinsing water admitted through the pipe $l$ can be replaced by steam.

I claim:

1. In filtering apparatus for syrups the combination of a tank having a perforated false bottom dividing the tank into upper and lower chambers, filtering medium resting on said bottom, an inlet for the syrup in the upper chamber, an outlet for the filtered syrup in the lower chamber, an overflow tank connected to said outlet, a syrup discharge conduit, an upwardly directed inlet pipe for a cleansing stream of steam and water in the upper chamber, a discharge cock for said cleansing stream in the syrup outlet pipe, a discharge conduit for said cleansing stream, a hollow central vertical shaft in the tank, hollow arms radiating from said shaft, pipes projecting from said arms downwards into the filtering medium, perforations in the walls of said pipes, inlets for rinsing water connected to the lower end of the vertical shaft and to the lower chamber, an outlet near the top of the upper chamber for said rinsing water, and means for rotating the hollow shaft together with its radiating arms and perforated pipes as set forth.

2. In filtering apparatus for syrups the combination of a tank having a perforated false bottom dividing the tank into upper and lower chambers, filtering medium resting on said bottom, an inlet for the syrup in the upper chamber, an outlet for the filtered syrup in the lower chamber, an overflow tank connected to said outlet, a syrup discharge conduit, an upwardly directed inlet pipe for a cleansing stream of steam and water in the upper chamber, a discharge cock for said cleansing stream in the syrup outlet pipe, a discharge conduit for said cleansing stream, a swivel pipe connecting the overflow tank with the syrup discharge conduit or with the discharge conduit for the cleansing water, a hollow central vertical shaft in the tank, hollow arms radiating from said shaft, pipes projecting from said arms downwards into the filtering medium, perforations in the walls of said pipes, inlets for rinsing water connected to the lower end of the vertical shaft and to the lower chamber, an outlet near the top of the upper chamber for said rinsing water, and means for rotating the hollow shaft together with its radiating arms and perforated pipes as set forth.

3. In filtering apparatus for syrup the combination of a tank having a perforated false bottom dividing the tank into upper and lower chambers, a cover for said tank, filtering medium resting on said bottom, an inlet for the syrup in the upper chamber, an outlet for the filtered syrup in the lower chamber, an overflow tank connected to said outlet, a syrup discharge conduit, an upwardly directed inlet pipe for a cleansing stream of steam and water in the upper chamber, a discharge cock for said cleansing stream in the syrup outlet pipe, a discharge conduit for the cleansing stream, a swivel pipe connecting the overflow tank with the syrup discharge conduit or with the discharge conduit for the cleansing water, a hollow central vertical shaft in the tank, hollow arms radiating from said shaft, pipes of oval cross section having inclined, closed, lower ends projecting downwards from said arms into the filtering medium, perforations in the walls of said pipes, inlets for rinsing water connected to the lower end of the vertical shaft and to the lower chamber an outlet near the top of the upper chamber for said rinsing water and means for rotating the hollow shaft together with its radiating arms and perforated pipes as set forth.

In witness whereof I have hereunto set my hand in presence of two witnesses.

LUDWIG HIRT.

Witnesses:
 HENRY HASPER,
 WOLDEMAR HAUPT.